No. 633,149. Patented Sept. 19, 1899.
E. A. OAKMAN.
BICYCLE GEARING.
(Application filed Nov. 15, 1897. Renewed Feb. 3, 1899.)
(No Model.) 2 Sheets—Sheet 1.
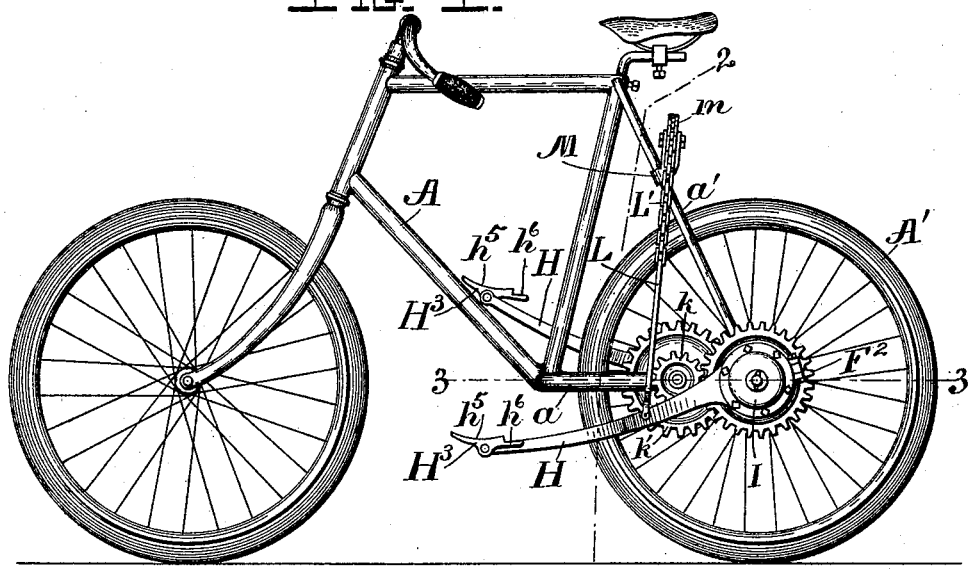
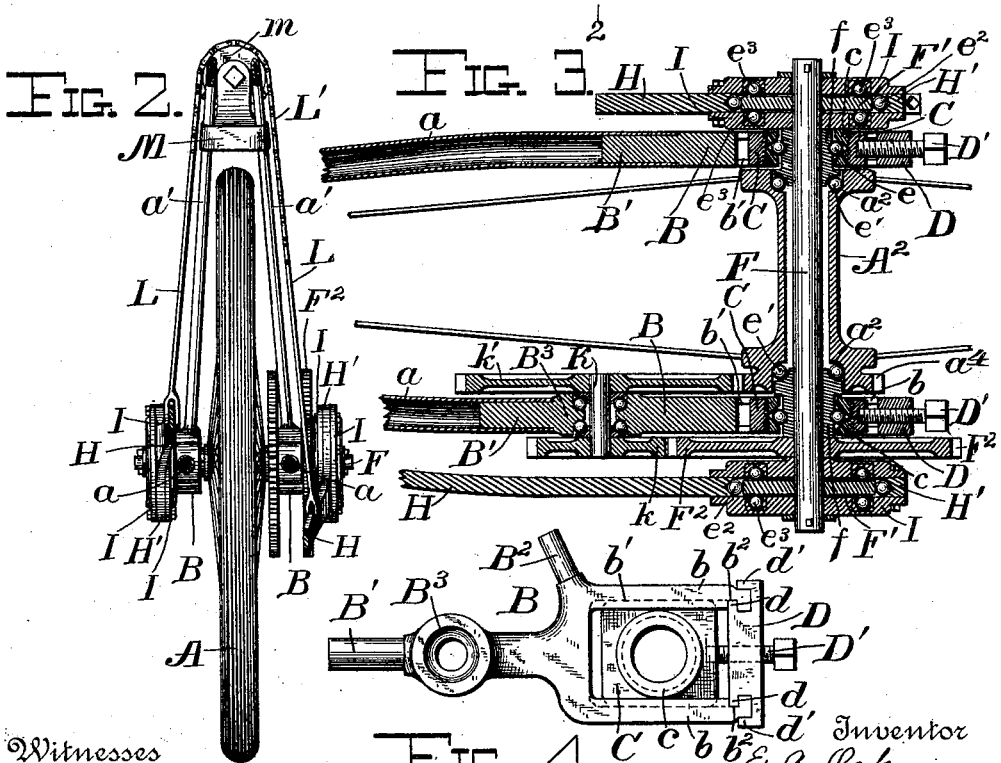
Witnesses
Inventor
E. A. Oakman
by Wilkinson & Fisher
Attorneys No. 633,149. Patented Sept. 19, 1899.
E. A. OAKMAN.
BICYCLE GEARING.
(Application filed Nov. 15, 1897. Renewed Feb. 3, 1899.)
(No Model.) 2 Sheets—Sheet 2.
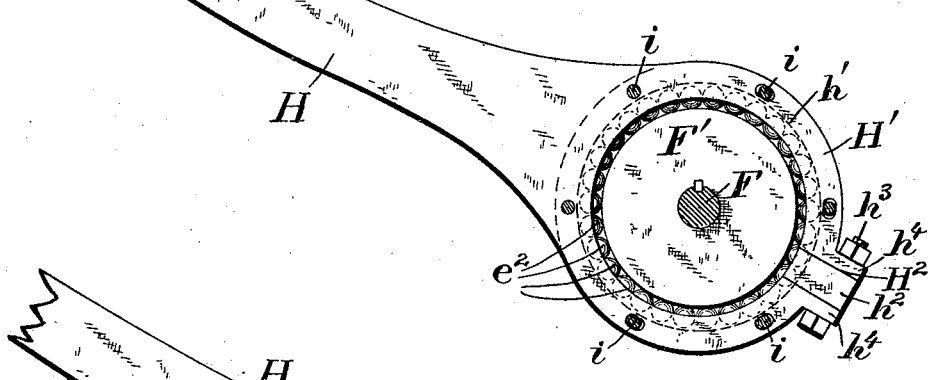
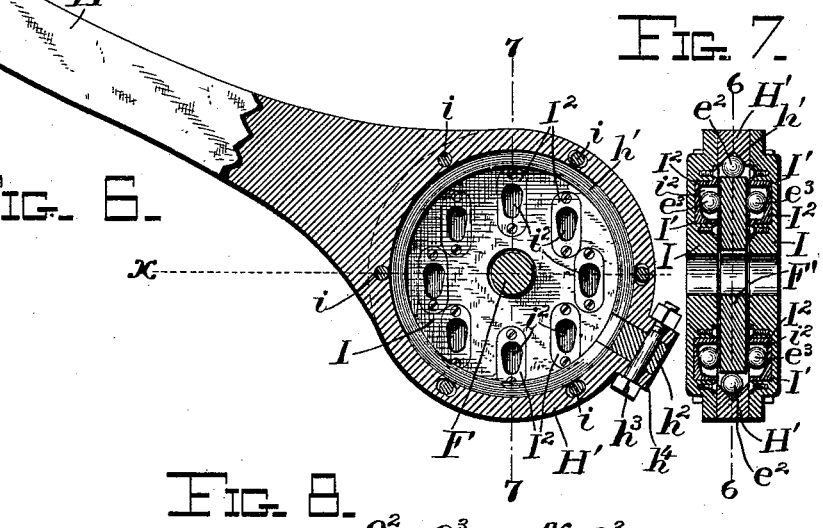
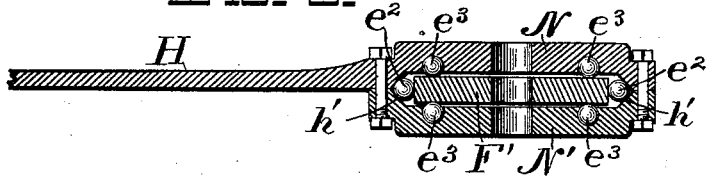

UNITED STATES PATENT OFFICE.

ERWIN A. OAKMAN, OF CHAPPELLS, SOUTH CAROLINA.

BICYCLE-GEARING.

SPECIFICATION forming part of Letters Patent No. 633,149, dated September 19, 1899.

Application filed November 15, 1897. Renewed February 3, 1899. Serial No. 704,433. (No model.)

*To all whom it may concern:*

Be it known that I, ERWIN A. OAKMAN, a citizen of the United States, residing at Chappells, in the county of Newberry and State of South Carolina, have invented certain new and useful Improvements in Bicycle-Gearing; and I do hereby declare the following to be a full, clear, and exact description of the invention, such as will enable others skilled in the art to which it appertains to make and use the same.

My invention relates to improvements in bicycle-driving mechanism; and it consists of the novel features hereinafter described and claimed.

Referring to the accompanying drawings, in which the same letters of reference designate the same parts in the several views, Figure 1 represents a side elevation of a bicycle with my improved driving mechanism applied thereto. Fig. 2 represents a vertical sectional view taken on the line 2 2 of Fig. 1 looking rearwardly. Fig. 3 represents a horizontal section through the rear hub and bearings, taken on the line 3 3 of Fig. 1. Fig. 4 represents a side elevation of the rear-fork connection. Fig. 5 represents a side elevation of the ball-clutch with one of the side disks removed. Fig. 6 is a sectional view of the same, taken on the line 6 6 of Fig. 7, with the center disk removed. Fig. 7 is a vertical sectional view through the clutch, taken on the line 7 7 of Fig. 6, showing the three disks in their relative positions. Fig. 8 is a horizontal sectional view through a modified form of clutch.

A designates the frame of a bicycle of the usual construction with the exception that the crank-hanger is omitted and a special form of rear-fork connection B is used. The rear-fork connection B is formed of a forging bifurcated at its rear end to form the two parallel arms $b$, which are grooved, as at $b'$, to form guides for the bearing-block C, and the said arms $b$ are connected at their rear ends by a cross-piece D, provided with lugs $d$ to engage transverse slots $b^2$ in the arms $b$ and hooked, as at $d'$, to take over the ends of the said arms $b$ to prevent the latter from spreading apart. An adjusting-screw D' is arranged in a threaded opening in the cross-piece D and enters an opening in the bearing-block C for the purpose of adjusting the said bearing-block, and with it the axle of the rear wheel. The bearing-block C is provided with a screw-threaded opening therethrough in which is arranged a pair of rings $c$, forming an adjustable ball-race for the balls $e$, which support the axle. On the forward end of the rear-fork connection B is formed around shank B' to fit the rear horizontal tubing $a$, and an upwardly-projecting shank $B^2$ is formed on the said connection to fit the rear-fork tube $a'$. The shanks B' and $B^2$ are placed in the tubing $a$ and $a'$, respectively, and secured by any suitable means. In one of the rear-fork connections B is formed a bearing $B^3$ for a purpose to be hereinafter explained. The axle F is provided with sleeves $f$, around which are formed races for the balls $e$, and the inner ends of the said sleeves are enlarged to form cones for the balls $e'$, upon which the rear wheel A' turns upon the axle F, the hub $A^2$ of the said rear wheel being provided with ball-races $a^2$ for the said balls $e'$.

From the foregoing it will be seen that the rear wheel A' is free to turn upon the axle F, and the latter is also free to turn in the bearings in the blocks C. Near each end of the axle F is rigidly secured, by a key or other suitable means, a disk F'.

The levers H are formed with rings H' at their rear ends, and the said rings are provided with ball-races $h'$ to receive the balls $e^2$, which when the parts are in their normal positions are arranged around the periphery of the disks F', as shown in Fig. 5 of the drawings, thus allowing the disks F' to revolve freely within the rings H'. The rings H' are open, as at $H^2$, to allow the insertion of the balls, the said openings being closed by pieces $h^2$, which are turned to correspond with the ball-race and held in position by the bolts $h^3$, which pass through the said pieces $h^2$ and through the lugs $h^4$ on the rings H', as shown in Figs. 5 and 6. Disks I are placed on each side of the rings H' and are held in position by bolts $i$, which pass through the said disks and rings, thus holding the several parts firmly together. The disks I are provided with a number of recesses I' around their inner surfaces, into which recesses are fitted hardened-steel blocks I², having tapered slots $i^2$ for the reception of the balls $e^3$. These slots are so arranged in the disks that when the levers H are in their raised positions the shallow ends of the slots all point downwardly approximately at right angles to the line $x$, which designates the horizontal line when the levers are in their raised positions, as shown in Fig. 6. The upper ends of the slots are deep enough to allow the balls when in the deeper ends to remain loosely against the central disks F' without binding. When the lever is in its raised position, the balls will gravitate toward the lower ends of the slots until they bind against the sides of the disks F' and opposite to each other, whereby none remain loose to rattle, as shown in Fig. 7, when the depression of one of the levers H will rotate the disk F' on the same side of the bicycle and with it the axle. As the lever is raised the balls $e$ will be rolled into the deeper ends of the slots, and thus allow the ring H' and the disk I to turn freely on the disk F' and axle. Of course it is evident that other forms of clutches as well as the gravity-clutch may be used. For instance, instead of having the races of the balls $e^3$ straight and vertically arranged, they may be curved and the balls held to their proper position by springs. Other equivalent forms will doubtless suggest themselves to others skilled in the art.

On the axle F, just outside of one of the rear-fork connections B, is rigidly mounted a gear-wheel F², which meshes with a pinion $k$ on a short shaft K, mounted in ball-bearings in the bearing B³ of the said rear fork connection. On the other end of the short shaft K is mounted a gear-wheel $k'$, meshing with a pinion $a^4$ on the hub A² of the rear wheel A' of the bicycle. Thus the rotation of the axle will be transmitted first to the shaft K and then to the hub of the wheel, the speed increasing with each transmission, according to the relative sizes of the several gear-wheels used. These gear-wheels are shown on the drawings much larger in proportion to the driving-wheel than they are in practice for clearness of illustration.

The two levers H are connected together by rods L and a chain L', which latter passes over a suitable wheel $m$, mounted in a bracket M on the rear-fork tubes $a'$, as shown in Figs. 1 and 2 of the drawings. By this construction it will be seen that when one lever is depressed the other lever will be raised. The levers H are provided at their forward ends with pedals H³, which I prefer to form with a concave portion $h^5$ for the ball of the foot and with an extension $h^6$ for the heel; but any other form of pedal may be used, if preferred.

The operation of the device is as follows: When one lever is pressed down, the balls $e^3$ will clutch on opposite sides of the disk F' and rotate the said disk and axle in the direction to turn the wheel forwardly, the motion being transmitted through the train of gearing to the rear wheel of the bicycle. At the same time the other lever will be raised by the action of the rods L and chain L', as will be readily understood. When the other lever is depressed, the axle will again be turned forwardly while the first lever is being raised. Thus the rear wheel A' of the bicycle will be continuously driven forward by the downward motion of the two levers acting alternately. Consequently the levers have a perfect and instantaneous control over the driving-axle at every point of its revolution, so that dead-centers will not occur. In lieu of the chain and rods for raising the levers I may use a spring arranged in any suitable manner, in which case both of the levers would remain normally in the raised position.

By forming the slots $i^2$ in the hardened-steel blocks I² it will be obvious that should a slot become worn or indented the block may be easily removed and a new one inserted in its place, thus making the life of the disks much longer; but should it be found desirable in practice I may form the slots directly in the disks which may be sufficiently hardened to withstand the pressure of the balls at the time the clutch is in operation.

In Fig. 8 is shown a modification of the clutch in which the ring H' is dispensed with, the clutch being formed of two members N and N' bolted together and inclosing the disk F'. In this instance the ball-race $h'$ is turned half in each member of the clutch and the slots for the balls $e^3$ may be formed either in the members themselves or in the hardened blocks, as hereinbefore described. The lever H is formed integral with or secured to one of the members. It is obvious that the clutch shown may be used not only in connection with a bicycle, but also in connection with various other forms of machinery.

Having thus described my invention, what I claim, and desire to secure by Letters Patent of the United States, is—

1. A clutch, consisting of a shaft, a disk rigidly mounted on said shaft, external disks arranged parallel to said disk and provided with slots on their inner faces and balls mounted in said slots and arranged so as to press at opposite points on the faces of said internal disk, substantially as described.

2. In a bicycle driving-gear the combination with an axle mounted to rotate in the frame, and disks rigidly mounted on the said axle, of clutches inclosing the said disks, balls mounted in the said clutches to press against the faces of said disks at opposite points, and means for turning the said clutches, substantially as described.

3. In a bicycle driving-gear the combination with an axle mounted to rotate in the frame, and disks rigidly mounted on the said axle, of clutches inclosing the said disks, blocks having tapering slots mounted in recesses in the said clutches balls in the said slots to press against the faces of said disks at opposite points, and means for turning the said clutches, substantially as described.

4. In a bicycle, the combination with an axle mounted to rotate in the frame, disks rigidly mounted on said axle, a wheel mounted to rotate on said axle and geared thereto, of clutches inclosing said disks, balls mounted in said clutches, to press against opposite points on the faces of said disks, levers for operating said clutches and a cord or chain connecting said levers, and passing over a part of the frame, substantially as described.

In testimony whereof I affix my signature in presence of two witnesses.

ERWIN A. OAKMAN.

Witnesses:
L. M. RAGIN,
JAMES M. GIBBS.